(12) United States Patent
Michaud et al.

(10) Patent No.: US 11,834,546 B2
(45) Date of Patent: Dec. 5, 2023

(54) POLYURETHANE-BASED COMPOSITION

(71) Applicant: Bostik SA, Colombes (FR)

(72) Inventors: Guillaume Michaud, Venette (FR);
Frédéric Simon, Venette (FR);
Stéphane Fouquay, Venette (FR)

(73) Assignee: Bostik SA, Colombes (FR)

( * ) Notice: Subject to any disclaimer, the term of this patent is extended or adjusted under 35 U.S.C. 154(b) by 846 days.

(21) Appl. No.: 16/762,300

(22) PCT Filed: Nov. 21, 2018

(86) PCT No.: PCT/FR2018/052940
§ 371 (c)(1),
(2) Date: May 7, 2020

(87) PCT Pub. No.: WO2019/102142
PCT Pub. Date: May 31, 2019

(65) Prior Publication Data
US 2020/0385509 A1  Dec. 10, 2020

(30) Foreign Application Priority Data
Nov. 22, 2017  (FR) ...................................... 1761029

(51) Int. Cl.
| | |
|---|---|
| C08G 18/40 | (2006.01) |
| B32B 7/12 | (2006.01) |
| B32B 15/20 | (2006.01) |
| B32B 37/12 | (2006.01) |
| C08G 18/28 | (2006.01) |
| C08G 18/79 | (2006.01) |
| C08L 75/06 | (2006.01) |
| C09J 175/06 | (2006.01) |

(52) U.S. Cl.
CPC ............ *C08G 18/4018* (2013.01); *B32B 7/12* (2013.01); *B32B 15/20* (2013.01); *B32B 37/12* (2013.01); *C08G 18/289* (2013.01); *C08G 18/2815* (2013.01); *C08G 18/794* (2013.01); *C08L 75/06* (2013.01); *C09J 175/06* (2013.01)

(58) Field of Classification Search
None
See application file for complete search history.

(56) References Cited

U.S. PATENT DOCUMENTS

| | | |
|---|---|---|
| 3,020,290 A | 2/1962 | Moss |
| 5,466,811 A | 11/1995 | Alexander |
| 2007/0151666 A1 | 7/2007 | Moeller et al. |
| 2017/0088661 A1 | 3/2017 | Michaud et al. |

FOREIGN PATENT DOCUMENTS

| | | |
|---|---|---|
| WO | 96/02253 A1 | 2/1996 |
| WO | 2015140458 A1 | 9/2015 |

OTHER PUBLICATIONS

ISA/EP; International Search Report and Written Opinion for International Patent Application No. PCT/FR2018/052940 dated Mar. 20, 2019, 10 pages.

*Primary Examiner* — Jeffrey D Washville
(74) *Attorney, Agent, or Firm* — NK Patent Law

(57) ABSTRACT

The invention relates to a composition comprising: —a composition A containing at least one polyurethane comprising at least two terminal functions T of formula (I): and —a composition B comprising at least one amine. Also disclosed is the use of said composition.

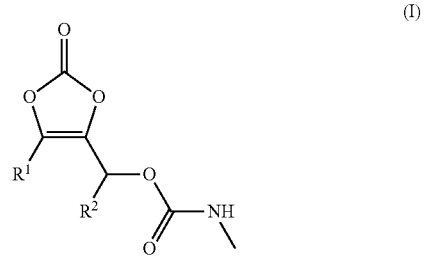

(I)

17 Claims, No Drawings

POLYURETHANE-BASED COMPOSITION

CROSS-REFERENCE TO RELATED APPLICATIONS

This application is a U.S. National Stage application of International Patent Application No. PCT/FR2018/052940, filed on Nov. 21, 2018, which claims the benefit of French Patent Application No. 1761029, filed on Nov. 22, 2017.

FIELD OF THE INVENTION

The present invention relates to a polyurethane-based composition.

The invention also relates to a multilayer structure (or complex) which may be used notably in the field of flexible packaging, which comprises at least two layers of material bonded together by a layer of the composition according to the invention.

The present invention also relates to a complexing process suitable for the manufacture of said complex.

TECHNOLOGICAL BACKGROUND

Flexible packagings intended for packaging very diverse products, such as those manufactured for the agrifood, cosmetics or detergents industries, generally consist of several thin layers (in the form of sheets or films), the thickness of which is between 5 and 150 μm and which consist of different materials, such as paper, a metal (for example aluminum) or thermoplastic polymers. The corresponding complex (or multilayer) film, the thickness of which can vary from 20 to 400 μm, makes it possible to combine the properties of the various individual layers of material and to thus provide the consumer with a combination of characteristics suitable for the final flexible packaging, for instance:

- its visual appearance (notably that of the printed elements presenting the information relating to the packaged product and intended for the consumer),
- a barrier effect to atmospheric moisture or oxygen,
- contact with food without risk of toxicity or of modification to the organoleptic properties of the packaged foodstuffs,
- chemical resistance for certain products, such as ketchup or liquid soap,
- good resistance to high temperature, for example in the case of pasteurization or sterilization.

To constitute the final packaging, the multilayer is generally formed by heat sealing, at a temperature ranging from about 120 to 250° C., this last technique also being used for closing the packaging around the product intended for the consumer.

The various layers of material of which the multilayer is composed are combined or assembled by laminating during industrial lamination processes.

These processes use adhesives (or glues) and devices (or machines) designed for this purpose. The multilayer film thus obtained is itself often termed a "laminate".

These processes first of all comprise a step of coating the adhesive onto a first layer of material, which consists of a deposit of a continuous layer of adhesive with a controlled thickness generally less than 10 μm, corresponding to an amount of adhesive (or basis weight) which is also controlled, generally not exceeding 10 g/m². This coating step is followed by a step of laminating a second layer of material, which may be identical to or different from the first layer, consisting of the application under pressure of this second layer of material onto the first layer of material covered with the layer of adhesive.

Polyurethane-based adhesives bearing NCO end groups are commonly used for this type of application.

However, polyurethane-based compositions bearing NCO end groups generally have the drawback of including large residual contents of aromatic diisocyanate originating from the polyurethane synthesis reaction, which may lead to a certain number of drawbacks, notably toxicity problems. Specifically, the non-labeling of polyurethanes requires residual diisocyanate contents of less than 0.1% by weight. In order to obtain such low residual contents, the production processes may be restrictive. In addition, it has been observed that polyurethane compositions having a content of MDI monomer (aromatic diisocyanate) of less than or equal to 1% by weight relative to the weight of the polyurethane composition are highly viscous at room temperature and have stability problems over time in terms of viscosity.

US 2007/0151666 describes an adhesive composition comprising a first constituent A based on a compound bearing at least two cyclocarbonate groups and a second constituent B based on a compound bearing at least two primary and/or secondary amine groups. The compositions described in said document do not make it possible to obtain a multilayer structure that is resistant to a high-temperature heat treatment, such as sterilization. In particular, it has been observed that the multilayer structure obtained with such compositions shows, after heat treatment in an autoclave, signs of degradation of the adhesive seal (presence of unevennesses, bubbles and/or un-crosslinking of the adhesive seal), in particular making said multilayer unsuitable for the manufacture of flexible packagings intended for packaging products.

The aim of the present invention is to provide a polyurethane-based composition which has better heat resistance, in particular with respect to the sterilization test.

Another aim of the present invention is to provide such a composition which is substantially or even totally free of residual polyisocyanate monomers, in particular of aromatic diisocyanate type (compound in which the NCO function is directly bonded to an aromatic ring).

DESCRIPTION OF THE INVENTION

In the present patent application, unless otherwise indicated:

- the amounts expressed in percentage form correspond to weight/weight percentages;
- the hydroxyl number of an alcoholic compound represents the number of hydroxyl functions per gram of product, and is expressed in the form of the equivalent number of milligrams of potassium hydroxide (KOH) used in the assay of the hydroxyl functions, per gram of product;
- the primary alkalinity represents the number of —NH$_2$ functions per gram of product, and is expressed in the form of the number of milliequivalents of —NH$_2$ per gram of product. It may be measured by NMR or by potentiometry according to methods that are well known to those skilled in the art;
- the total alkalinity represents the number of amino functions (of primary, secondary and tertiary amine type) per gram of product, and is expressed in the form of milliequivalents of HCl per gram of product. The total alkalinity may be determined by NMR or by potentiometric assay;

the measurement of viscosity at 23° C. may be performed using a Brookfield viscometer according to the standard ISO 2555. Typically, the measurement taken at 23° C. may be performed using a Brookfield RVT viscometer with a spindle suitable for the viscosity range and at a rotational speed of 20 revolutions per minute (rpm). The viscosity of a product is preferably measured at least 24 hours after manufacturing said product;

the number-average molecular masses (Mn) of the polyols are calculated from their hydroxyl numbers and from their functionalities;

the molar masses of the diamines (B1) are calculated from their primary and/or total alkalinities, and/or from their functionality;

the molar masses (or average molar masses in the case of a mixture) of the polyamines (B2) are calculated from their chemical structures ($^1H/^{13}C$ NMR) and from their primary and/or secondary and/or tertiary and/or total alkalinities.

A first subject of the present invention relates to a composition, preferably an adhesive composition, comprising:

a composition A comprising at least one polyurethane comprising at least two end functions T of formula (I) below:

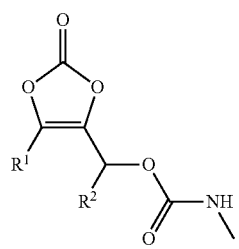

(I)

in which $R^1$ and $R^2$, which may be identical or different, each represent a hydrogen atom, a linear or branched alkyl group, preferably a C1-C6 alkyl group, a cycloalkyl group, preferably a C5-C6 cycloalkyl group, a phenyl group, preferably a C6-C12 phenyl group, or an alkylphenyl group with a linear or branched alkyl chain, preferably a C1-C4 alkyl chain; or $R^1$ and $R^2$ may be bonded together to form a group $-(CH_2)_n-$ with n=3, 4 or 5, and a composition B comprising at least one amine.

The composition according to the invention advantageously has better heat resistance, in particular with respect to the sterilization test.

The composition according to the invention advantageously has better reactivity at moderate and low temperature, in particular at a temperature of less than or equal to 60° C., and notably between 0° C. and 60° C.

Composition A

The abovementioned polyurethane comprising at least two end functions T may represent from 10% to 100% by weight of composition A, preferably from 20% to 95% by weight, more preferentially from 30% to 90% by weight, and better still from 40% to 80% by weight, relative to the total weight of composition A.

The abovementioned polyurethane comprising at least two end functions T may be obtained by reaction of a polyurethane bearing NCO end groups and of at least one compound of formula (II) below:

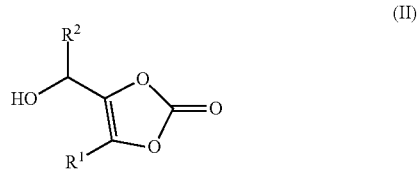

(II)

in which $R^1$ and $R^2$, which may be identical or different, each represent a hydrogen atom, a linear or branched alkyl group, preferably a C1-C6 alkyl group, a cycloalkyl group, preferably a C5-C6 cycloalkyl group, a phenyl group, preferably a C6-C12 phenyl group, or an alkylphenyl group with a linear or branched alkyl chain, preferably a C1-C4 alkyl chain; or $R^1$ and $R^2$ may be bonded together to form a $-(CH_2)_n-$ group with n=3, 4 or 5.

The compounds of formula (II) may be synthesized as described in EP0078413, for example according to the following scheme:

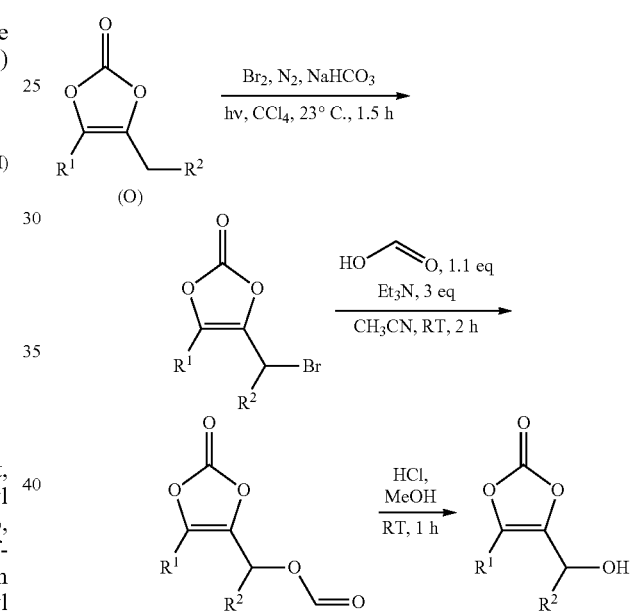

The abovementioned compound (0) may be synthesized by the methods described in Liebigs Annalen der Chemie, Vol. 764, pages 116-124 (1972), Tetrahedron Letters, 1972, pages 1701-1704 or U.S. Pat. No. 3,020,290.

The compounds of formula (II) may also be prepared as described in WO 96/02253.

According to a preferred embodiment, the compounds of formula (II) are those corresponding to formula (II-1) below:

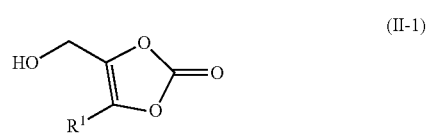

(II-1)

in which $R^1$ is as defined previously. The compounds of formula (II-1) are compounds of formula (II) in which $R^2$ is a hydrogen.

According to a preferred embodiment, the compounds of formula (II) have the formula (II-1a) below:

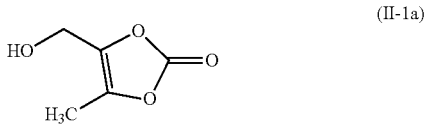

The compound of formula (II-1a) is 4-hydroxymethyl-5-methyl-1,3-dioxolen-2-one.

The compound of formula (II-1a) is a compound of formula (II) in which $R^2$ is a hydrogen, and $R^1$ is a methyl. The compound of formula (II-1a) may be obtained as described in WO 96/02253, namely in particular according to the following scheme:

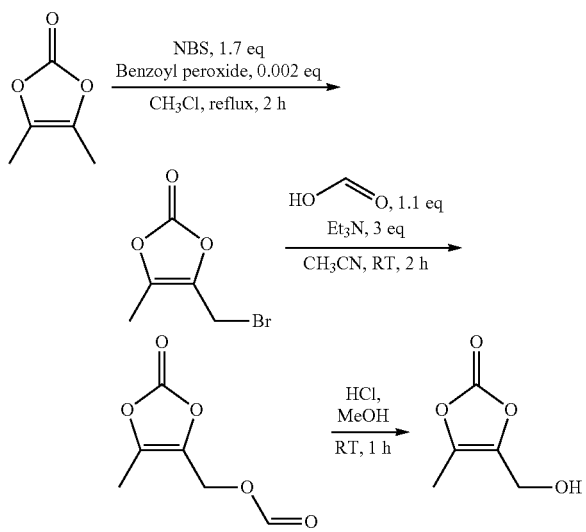

According to one embodiment, the abovementioned polyurethane comprising at least two end functions T is prepared via a process comprising the following steps:
  E1) the preparation of a polyurethane bearing NCO end groups via a polyaddition reaction:
    i) of at least one polyisocyanate preferably chosen from diisocyanates, triisocyanates, and mixtures thereof;
    ii) with at least one polyol, preferably chosen from polyether polyols, polycarbonate polyols, polyester polyols, and mixtures thereof; in amounts such that the NCO/OH mole ratio (r1) is strictly greater than 1, preferably ranges from 1.6 to 1.9 and preferentially from 1.65 to 1.85;
  and
  E2) the reaction of the product formed on conclusion of step E1) with at least one compound of formula (II) as defined above,
in amounts such that the NCO/OH mole ratio (r2) is less than or equal to 1, preferably between 0.90 and 1 and preferentially between 0.95 and 1.

In the context of the invention, and unless otherwise mentioned, (r1) is the NCO/OH mole ratio corresponding to the mole ratio of the number of isocyanate groups (NCO) to the number of hydroxyl groups (OH) borne by all of the polyisocyanate(s) and polyol(s) present in the reaction medium of step E1).

In the context of the invention, and unless otherwise mentioned, (r2) is the NCO/OH mole ratio corresponding to the mole ratio of the number of isocyanate groups to the number of hydroxyl groups borne, respectively, by all of the isocyanate(s) (as notably regards the polyurethane bearing NCO end groups and optionally the polyisocyanate(s) which have not reacted at the end of step E1)), and alcohol(s) present in the reaction medium of step E2).

When the polyurethane bearing NCO end groups is obtained during step E1) from a mixture of polyisocyanates or of several polyisocyanates added successively, the calculation of the ratio (r1) takes into account firstly the NCO groups borne by all of the polyisocyanates present in the reaction medium of step E1), and secondly the OH groups borne by the polyol(s) present in the reaction medium of step E1).

During step E1), the polyaddition reaction is performed at a temperature preferably below 95° C., and preferably under anhydrous conditions.

Step E1)

Polyol(s)

The polyol(s) that may be used to prepare the polyurethane bearing NCO end groups used according to the invention may be chosen from those for which the number-average molecular mass (Mn) ranges from 300 to 12 000 g/mol, preferably from 400 to 4000 g/mol and preferentially from 500 to 2000 g/mol.

Preferably, their hydroxyl functionality ranges from 2 to 3. The hydroxyl functionality is the mean number of hydroxyl functions per mole of polyol.

Preferably, the polyol(s) that may be used according to the invention have a hydroxyl number (OHN) ranging from 9 to 570 milligrams of KOH per gram of polyol (mg KOH/g), preferably from 35 to 430 mg KOH/g, more preferably from 55 to 340 mg KOH/g. According to a particular embodiment, the hydroxyl number of polyol(s) having a hydroxyl functionality of 2 ranges from 20 to 380 mg KOH/g, preferably from 35 to 290 mg KOH/g, more preferably from 50 to 230 mg KOH/g. According to one embodiment, the hydroxyl number of polyol(s) having a hydroxyl functionality of 3 ranges from 40 to 570 mg KOH/g, preferably from 55 to 430 mg KOH/g, more preferably from 80 to 340 mg KOH/g.

The polyol(s) may be chosen from polyether polyols, polyester polyols, polycarbonate polyols, and mixtures thereof. Preferably, step (E1) is performed with a mixture of polyether polyols and polyester polyols.

The polyether polyol(s) that may be used according to the invention are preferably chosen from polyoxyalkylene polyols, the linear or branched alkylene portion of which comprises from 2 to 4 carbon atoms, more preferentially from 2 to 3 carbon atoms.

More preferentially, the polyether polyol(s) that may be used according to the invention are preferably chosen from polyoxyalkylene-diols or polyoxyalkylene triols, the linear or branched alkylene portion of which comprises from 1 to 4 carbon atoms, more preferentially from 2 to 3 carbon atoms.

As examples of polyoxyalkylene diols or triols that may be used according to the invention, mention may be made of:
  polyoxypropylene diols or triols (also denoted by polypropylene glycol (PPG) diols or triols) having a number-average molecular mass (Mn) ranging from 300 to 12 000 g/mol;
  polyoxyethylene diols or triols (also denoted by polyethylene glycol (PEG) diols or triols) having a number-average molecular mass (Mn) ranging from 300 to 12 000 g/mol;
  and mixtures thereof.

The abovementioned polyether polyols may be prepared conventionally and are widely commercially available. They may be obtained by polymerization of the corresponding alkylene oxide in the presence of a basic catalyst (for example potassium hydroxide) or a catalyst based on a double metal/cyanide complex.

As examples of polyether diols, mention may be made of the polyoxypropylene diol sold under the name Voranol® P 400 by the company Dow, with a number-average molecular mass (Mn) in the vicinity of 400 g/mol and the hydroxyl number of which ranges from 250 to 270 mg KOH/g.

As examples of polyether triols, mention may be made of the polyoxypropylene triol sold under the name Voranol® CP 450 by the company Dow, with a number-average molecular mass (Mn) in the vicinity of 450 g/mol and the hydroxyl number of which ranges from 370 to 396 mg KOH/g.

The polyester polyols may be chosen from polyester diols and polyester triols, and preferably from polyester diols.

As examples of polyester diols, mention may be made of Realkyd® XTR 10410 sold by the company Cray Valley, with a number-average molecular mass (Mn) in the vicinity of 1000 g/mol and the hydroxyl number of which ranges from 108 to 116 mg KOH/g. It is a product resulting from the condensation of adipic acid, diethylene glycol and monoethylene glycol.

The polycarbonate polyols may be chosen from polycarbonate diols or triols, in particular with a number-average molecular mass ($M_n$) ranging from 300 g/mol to 12 000 g/mol.

As examples of polycarbonate diols, mention may be made of:
  Converge Polyol 212-10 and Converge Polyol 212-20 sold by the company Novomer, with respective number-average molecular masses ($M_n$) equal to 1000 and 2000 g/mol, the hydroxyl numbers of which are, respectively, 112 and 56 mg KOH/g,
  Desmophen® C XP 2716 sold by Covestro, with a number-average molecular mass ($M_n$) equal to 326 g/mol, and the hydroxyl number of which is 344 mg KOH/g,
  Polyol C-590, C1090, C-2090 and C-3090 sold by Kuraray, with a number-average molecular mass ($M_n$) ranging from 500 to 3000 g/mol and a hydroxyl number ranging from 224 to 37 mg KOH/g.

According to one embodiment, step E1) is performed in the presence of a mixture of polyols, and in particular a mixture of polyether diol, polyether triol and polyester diol.

Polyisocyanate(s)

The polyisocyanate(s) that may be used to prepare the polyurethane used according to the invention may be added sequentially or reacted in the form of a mixture.

The diisocyanate(s) that may be used during step E1) may have the formula OCN—$R^3$—NCO in which $R^3$ represents a linear, branched or cyclic divalent alkylene radical comprising from 5 to 140 carbon atoms, preferably from 6 to 70 carbon atoms, more preferably from 7 to 40 carbon atoms, even more preferentially from 8 to 24 carbon atoms.

According to one embodiment, $R^3$ is chosen from one of the following divalent radicals, of which the formulae below show the two free valencies:

a) the divalent radical derived from isophorone:

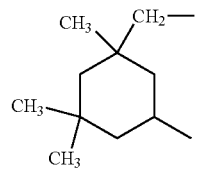

b) the radical derived from 4,4'-HMDI:

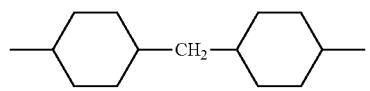

c) the divalent radical derived from TDI;

d) the divalent radical derived from MDI;

e) the divalent radical —$(CH_2)_6$— (or hexamethylene radical), which is derived from hexadimethylene diisocyanate (HDI);

f) the divalent radical derived from xylylene diisocyanate;

g) the divalent radical derived from 1,3-bis(isocyanatomethyl)cyclohexane (m-H6XDI):

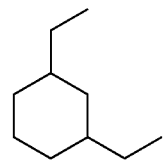

h) the divalent radical derived from 4,4'-methylene dicyclohexyl diisocyanate (H12MDI):

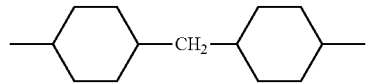

i) the divalent radical derived from tetramethylxylylene diisocyanate (such as m-TMXDI):

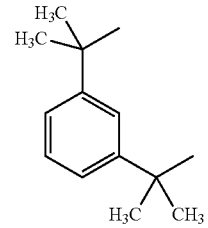

j) the divalent radical derived from an allophanate derived from a diisocyanate of formula NCO—$R^3$—NCO, for instance the divalent radical derived from an HDI allophanate of formula (Y) below:

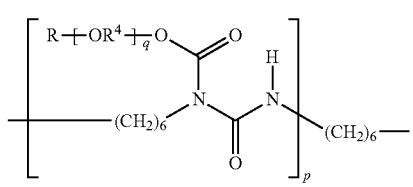

in which:
p is an integer ranging from 1 to 2;
q is an integer ranging from 0 to 9, and preferably from 2 to 5;
R represents a saturated or unsaturated, cyclic or acyclic, linear or branched hydrocarbon-based chain comprising from 1 to 20 carbon atoms, preferably from 6 to 14 carbon atoms;
$R^4$ represents a linear or branched divalent alkylene group containing from 2 to 4 carbon atoms, and preferably a divalent propylene group.

According to one embodiment, $R^3$ is chosen from one of the following divalent radicals, of which the formulae below show the two free valencies:

a) the divalent radical derived from isophorone:

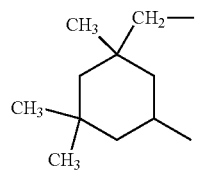

b) the radical derived from 4,4'-HMDI:

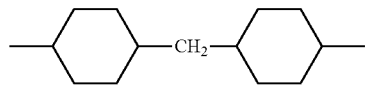

c) the divalent radical derived from 2,4-TDI or 2,6-TDI:

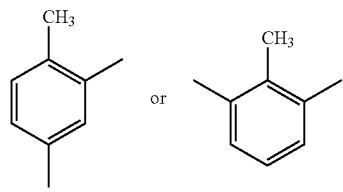

d) the divalent radical derived from 2,4'-MDI or 4,4'-MDI:

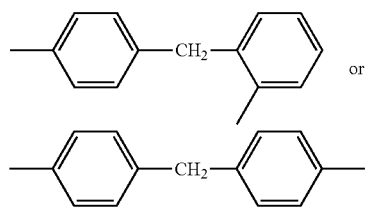

e) the divalent radical —$(CH_2)_6$— (or hexamethylene radical), which is derived from hexadimethylene diisocyanate (HDI);

f) the divalent radical derived from xylylene diisocyanate (such as m-XDI):

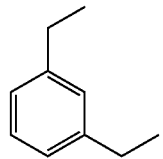

g) the divalent radical derived from 1,3-bis(isocyanatomethyl)cyclohexane (m-H6XDI):

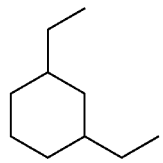

h) the divalent radical derived from 4,4'-methylene dicyclohexyl diisocyanate (H12MDI):

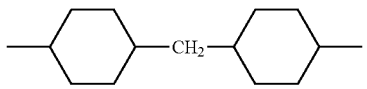

i) the divalent radical derived from tetramethylxylylene diisocyanate (such as m-TMXDI):

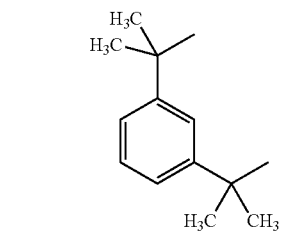

j) the divalent radical derived from an allophanate derived from a diisocyanate of formula NCO—$R^3$—NCO, for instance the divalent radical derived from an HDI allophanate of formula (Y) below:

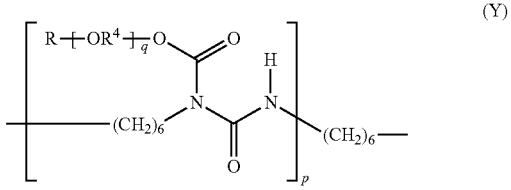

in which:
p is an integer ranging from 1 to 2;
q is an integer ranging from 0 to 9, and preferably from 2 to 5;

R represents a saturated or unsaturated, cyclic or acyclic, linear or branched hydrocarbon-based chain comprising from 1 to 20 carbon atoms, preferably from 6 to 14 carbon atoms;

$R^4$ represents a linear or branched divalent alkylene group containing from 2 to 4 carbon atoms, and preferably a divalent propylene group.

Preferably, p, q, R and $R^4$ are chosen such that the HDI allophanate derivative above comprises a content of isocyanate group NCO ranging from 12% to 14% by weight relative to the weight of said derivative.

The triisocyanate(s) that may be used according to the invention may be chosen from isocyanurates, biurets and adducts of diisocyanates and of triols.

In particular, the isocyanurate(s) may be used in the form of a technical mixture of (poly)isocyanurate(s) with a purity of greater than or equal to 70% by weight of isocyanurate(s).

Preferably, the diisocyanate isocyanurate(s) that may be used according to the invention correspond(s) to the general formula (W) below:

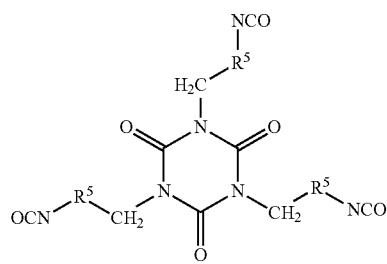
(W)

in which $R^5$ represents a linear, branched or cyclic, aliphatic or aromatic alkylene group comprising from 4 to 9 carbon atoms, with the proviso that the NCO groups are not connected via a covalent bond to a carbon atom forming part of an aromatic hydrocarbon-based ring, such as a phenyl group.

As examples of diisocyanate trimers that may be used according to the invention, mention may be made of:

the isocyanurate trimer of hexamethylene diisocyanate (HDI):

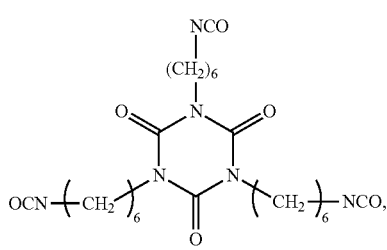

the isocyanurate trimer of isophorone diisocyanate (IPDI):

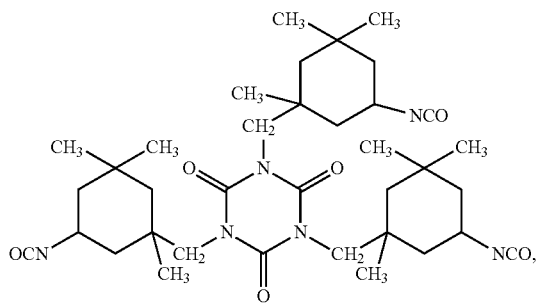

the isocyanurate trimer of pentamethylene diisocyanate (PDI):

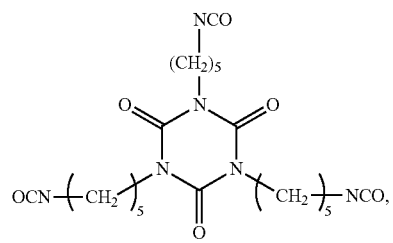

the isocyanurate trimer of meta-xylylene diisocyanate (m-XDI):

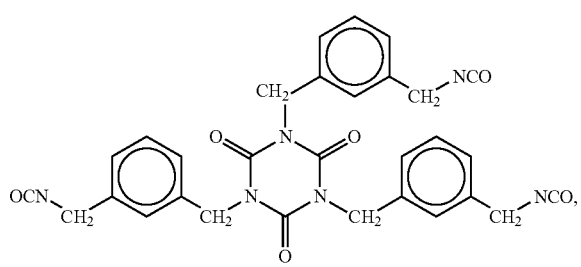

the isocyanurate trimer of m-XDI, in hydrogenated form:

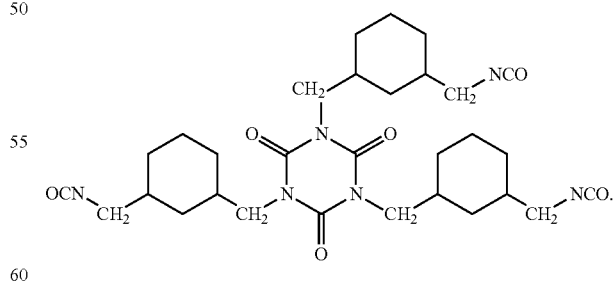

As examples of adducts of diisocyanates and of triols that may be used according to the invention, mention may be made of the adduct of meta-xylylene diisocyanate and of trimethylolpropane, as represented below. This adduct is sold, for example, by the company Mitsui Chemical, Inc. under the name Takenate® D-110N.

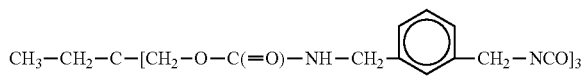

The polyisocyanate(s) that may be used to prepare the polyurethane used according to the invention are typically widely commercially available. By way of example, mention may be made of Scuranate® TX sold by the company Vencorex, corresponding to a 2,4-TDI having a purity of the order of 95%, Scuranate® T100 sold by the company Vencorex, corresponding to a 2,4-TDI having a purity of greater than 99% by weight, Desmodur® I sold by the company Covestro, corresponding to an IPDI or else Desmodur® N3300 sold by the company Covestro, corresponding to an HDI isocyanate, Takenate™ 500 sold by Mitsui Chemicals, corresponding to an m-XDI, Takenate™ 600 sold by Mitsui Chemicals, corresponding to an m-H6XDI, Vestanat® H12MDI sold by Evonik, corresponding to an H12MDI.

Preferably, the polyisocyanate(s) are chosen from the isocyanurate trimer of hexamethylene diisocyanate, the isocyanurate trimer of pentamethylene diisocyanate, isophorone diisocyanate (IPDI), toluene diisocyanate (TDI), xylylene diisocyanate (XDI), and mixtures thereof.

The polyaddition reaction of step E1) may be performed in the presence or absence of at least one reaction catalyst.

The reaction catalyst(s) that may be used during the polyaddition reaction of step E1) may be any catalyst known to those skilled in the art for catalyzing the formation of polyurethane by reaction of at least one polyisocyanate with at least one polyol.

An amount ranging up to 0.3% by weight of catalyst(s), relative to the weight of the reaction medium of step E1), may be used. In particular, it is preferable to use from 0.02% to 0.2% by weight of catalyst(s) relative to the total weight of the reaction medium of step E1).

Step E2)

According to one embodiment, step E2) is performed at a temperature below 95° C., and preferably under anhydrous conditions.

Step E2) may be performed with a compound of formula (II) or with a mixture of compounds of formula (II) of different nature.

The abovementioned compound(s) of formula (II) may be used either pure or in the form of a mixture or a composition preferably containing at least 90% by weight of compound(s) of formula (II).

Step E2) may be performed with a mixture of compounds of formula (II) of different nature (for example with different $R^1$, or different $R^2$, or else with different $R^1$ and $R^2$).

By way of example of a compound of formula (II), mention may be made of 4-hydroxymethyl-5-methyl-1,3-dioxolen-2-one available from Fluorochem and Oxchem with a molar mass of 130.1 g/mol and a hydroxyl number in the region of 431 mg KOH/g.

The calculation of the ratio (r2) notably takes into account firstly the NCO groups borne by all of the isocyanates present in the reaction medium during step E2 (polyurethane bearing NCO end groups and optionally the unreacted polyisocyanates which served for its synthesis derived from step E1) and secondly the OH groups borne by the compound(s) of formula (II), and optionally the residual alcohol(s) used in step E1).

Composition A may also comprise at least one solvent, preferably in an amount ranging from 10% to 50% by weight, more preferentially ranging from 15% to 40% by weight and better still ranging from 20% to 30% by weight, relative to the total weight of composition A.

The solvent may be chosen from organic solvents and alcoholic solvents such as ethyl acetate, methyl ethyl ketone, xylylene, ethanol, isopropanol, tetrahydrofuran, methyltetrahydrofuran or else from Isane® (based on isoparaffins, available from the company Total) or Exxol® D80 (based on aliphatic hydrocarbons, available from the company ExxonMobil Chemical).

According to one embodiment, composition A has a viscosity, measured at room temperature (23° C.), ranging from 500 to 10 000 mPa·s, preferably ranging from 1000 to 5000 mPa·s.

According to one embodiment, the polyurethane comprising at least two abovementioned end functions T has the formula (III) below:

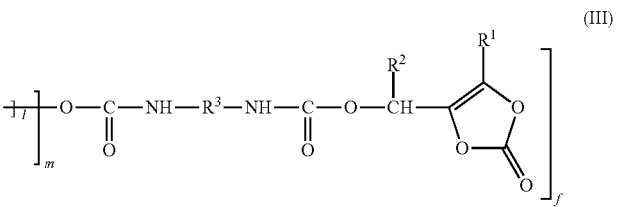

in which:

$R^1$ and $R^2$ are as defined above, preferably being a methyl and $R^2$ preferably being a hydrogen atom;

P represents one of the two formulae below:

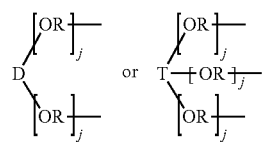

in which D and T represent, independently of each other, a linear or branched, cyclic, alicyclic or aromatic, saturated or unsaturated hydrocarbon-based radical comprising from 2 to 66 carbon atoms, optionally comprising one or more heteroatoms;

$R^3$ being as defined previously, and preferably representing a linear or branched divalent alkylene radical comprising from 1 to 13 carbon atoms, preferably from 6 to 13 carbon atoms;

R represents a linear or branched divalent alkylene radical comprising from 2 to 4 carbon atoms, preferentially of propylene type;

i is an integer such that the molecular mass of the block of formula —[OR]$_i$— ranges from 300 to 12 000 g/mol;

j is an integer such that the average molecular mass of the polyether block of formula —[OR]$_j$— ranges from 100 g/mol to 2000 g/mol;

m and f are integers such that the average molecular mass of the polymer ranges from 600 to 100 000 g/mol;

f is equal to 2 or 3.

The polyurethane according to the invention preferably contains from 0.1 to 1.5 milliequivalents of functions T of abovementioned formula (I) per gram of said polyurethane, more preferentially from 0.5 to 1.2 milliequivalents of functions T per gram of said polyurethane, and advantageously from 0.5 to 1 milliequivalent of functions T per gram of said polyurethane.

Composition B

Composition B comprises at least one amine.

The amine may be an amine comprising at least one primary amine function and/or at least one secondary amine function.

Preferably, the amine of composition B is a diamine B1 and/or a polyamine B2.

In the context of the invention, and unless otherwise mentioned, the term "diamine" means a compound comprising two amine functions.

The diamine B1 may comprise two primary amine functions, or two secondary amine functions, or one primary amine function and one secondary amine function. Preferably, the diamine B1 comprises two primary amine functions.

In the context of the invention, and unless otherwise mentioned, the term "polyamine" means a compound comprising at least two amine functions, preferably at least three amine functions.

The polyamine B2 may comprise at least two primary amine functions, or at least two secondary amine functions, or at least one primary amine function and at least one secondary amine function. Preferably, the polyamine B2 comprises two primary amine functions.

According to one embodiment, composition B comprises:
at least one diamine B1 preferably comprising two —CH$_2$—NH$_2$ groups, and
at least one polyamine B2 preferably comprising at least three —CH$_2$—NH$_2$ groups,
composition B in which the diamine B1/polyamine B2 mass ratio preferably ranges from 30/70 to 70/30.

Preferably, the diamine B1 corresponds to one of the formulae (IV) or (V) below:

(IV)

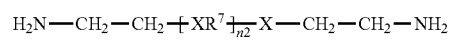

(V)

in which:

$R^6$ is a linear or branched, alicyclic or aromatic divalent alkylene radical, such that the molar mass of the diamine B1 ranges from 100 to 600 g/mol;

$R^7$ represents a linear or branched divalent alkylene radical comprising from 2 to 4 carbon atoms, preferentially of ethylene and/or propylene type, with X=O, S, NH or NR$^8$ in which R$^8$ is a linear or branched, saturated or unsaturated C$_1$-C$_{20}$ alkyl group;

n1 and n2 are integers such that the molar mass of the diamine B1 ranges from 100 to 600 g/mol.

As examples of diamines B1, mention may be made of diethylenetriamine (DETA) corresponding to the formula: H$_2$N—CH$_2$—CH$_2$—NH—CH$_2$—CH$_2$—NH$_2$ having a primary alkalinity of 19.39 meq/g, 1,10-decanediamine H$_2$N—(CH$_2$)$_{10}$—NH$_2$ having a primary alkalinity of 11.61 meq/g, or else the polyetherdiamine of formula: H$_2$N—CH$_2$—CH$_2$—O—CH$_2$—CH$_2$—O—CH$_2$—CH$_2$—NH$_2$ having a primary alkalinity of 13.49 meq/g (available, for example, under the trade name Jeffamine® ED 148 from the company Huntsman).

Other examples of diamines B1 that may be used are fatty amine dimers including two primary amine groups with a primary alkalinity ranging from 3.39 meq/g to 3.70 meq/g. These fatty amine dimers may be obtained from corresponding dimerized fatty acids. As examples of such fatty amine dimers, mention may be made of Priamine® 1071 (available from the company Croda) or those corresponding to the following formulae:

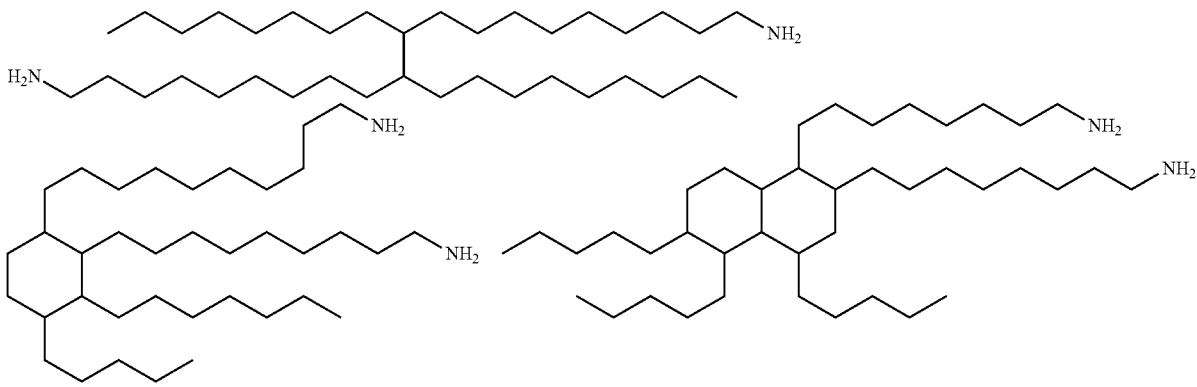

The fatty acid dimers used to prepare the abovementioned fatty amines are obtained by high-temperature polymerization under pressure of unsaturated fatty monocarboxylic acids (monomeric acid) comprising from 6 to 22 carbon atoms, preferably from 12 to 20 carbon atoms, and originate from plant or animal sources. Mention may be made, as examples of such unsaturated fatty acids, of C18 acids bearing one or two double bonds (respectively oleic acid or linoleic acid) obtained from tall oil, which is a byproduct of the manufacture of paper pulp. After polymerization of these unsaturated fatty acids, a technical mixture is obtained which contains, on average, 30-35% by weight of fatty monocarboxylic acids, often isomerized, relative to the starting unsaturated fatty monocarboxylic acids, 60-65% by weight of dicarboxylic acids (dimeric acids) comprising twice the carbon number relative to the starting unsaturated fatty monocarboxylic acids. The different commercial grades of dimeric, monomeric or trimeric acids are obtained by purification of this mixture. These dimeric fatty acids are then subjected to a reductive ammoniation ($NH_3/H_2$) reaction in the presence of a catalyst, making it possible to obtain the dimerized fatty amines.

According to one embodiment, the diamine B1 has an average molar mass ranging from 100 to 650 g/mol.

According to one embodiment of the invention, the diamine B1 or the mixture of diamines B1 has a primary alkalinity ranging from 3.00 to 20.00 meq $NH_2$/g, preferably from 9.00 to 15.00 meq/g.

According to one embodiment, the polyamine B2 comprises at least three —$CH_2$—$NH_2$ groups, preferably at least four —$CH_2$—$NH_2$ groups.

According to one embodiment, the polyamine B2 is chosen from the group consisting of polyethyleneimines (PEI), polyethyleneimine dendrimers, polypropyleneimines (PPI), polypropyleneimine dendrimers, poly(propylene-ethylene)imines, polyallylamines, tris(aminoethyl)amine (TAEA), tris(aminopropyl)amine (TAPA), and mixtures thereof. Preferably, the polyamine B2 is chosen from polyethyleneimines (PEI), poly(ethylene-propylene)imines, and mixtures thereof.

The polyamine B2 may be chosen from the compounds of formulae (VI) to (XVII) below:

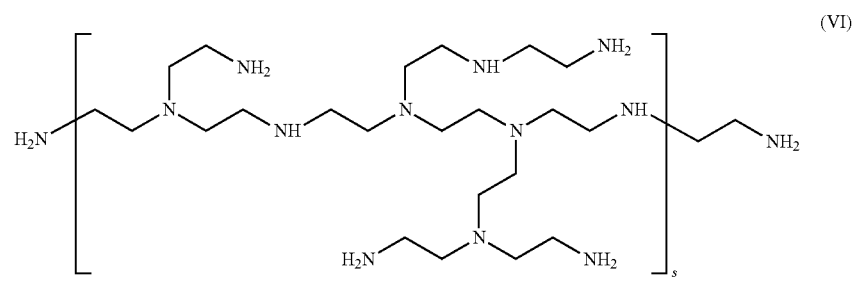
(VI)

in which s is an integer such that the average molar mass ranges from 130 to 1800 g/mol, preferably ranges from 140 to 1700 g/mol;

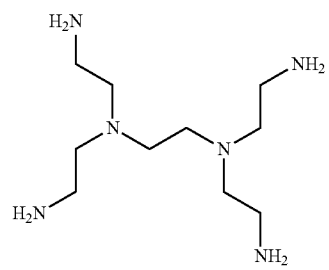
(VII)

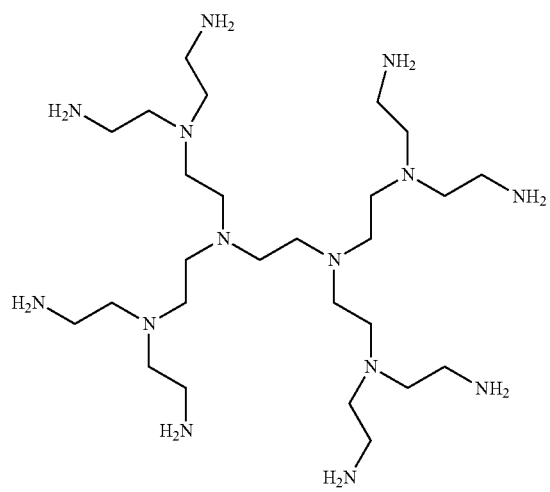
(VIII)

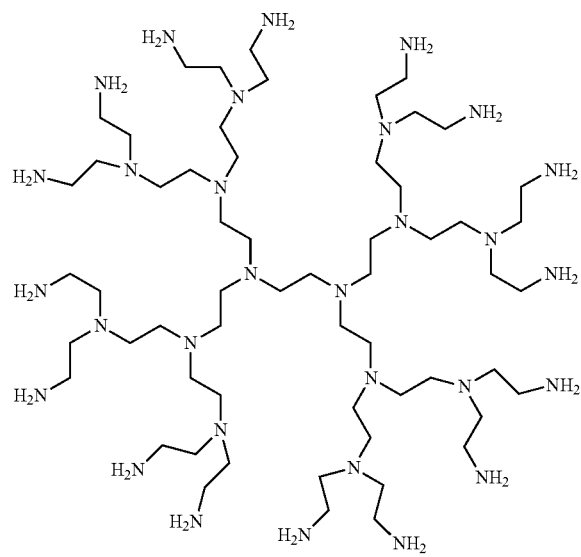
(IX)
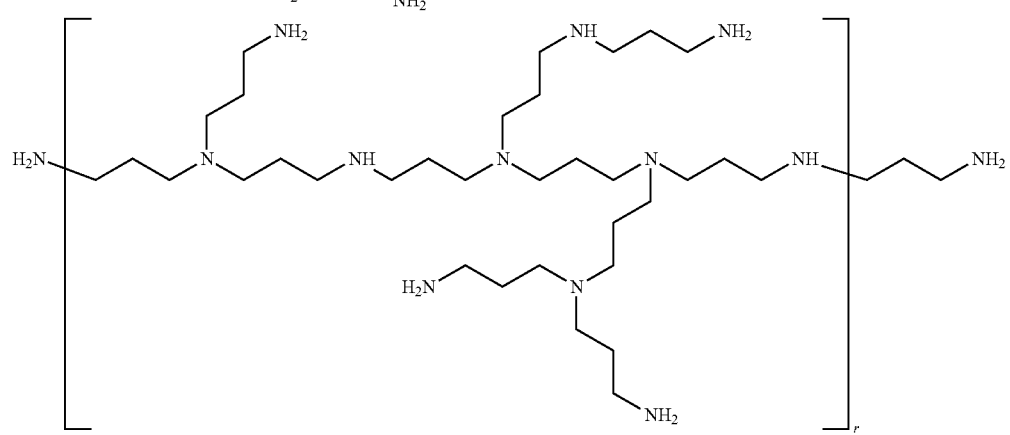
(X)
in which r is an integer such that the number-average molar mass ranges from 130 to 1800 g/mol, preferably ranges from 140 to 1700 g/mol;
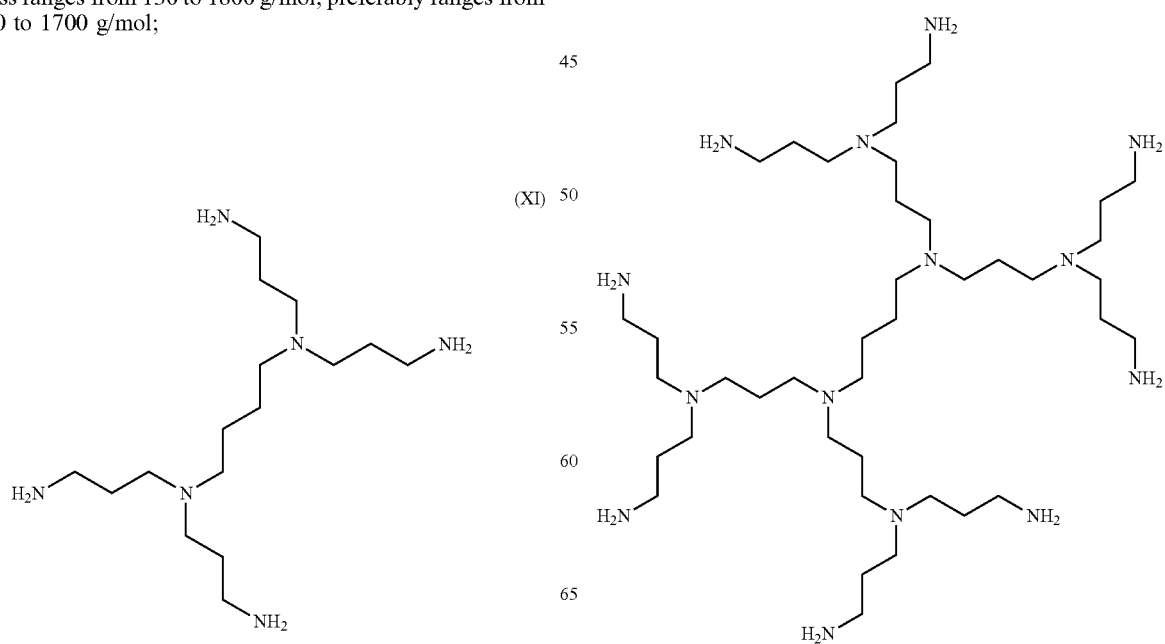
(XI)
(XII)

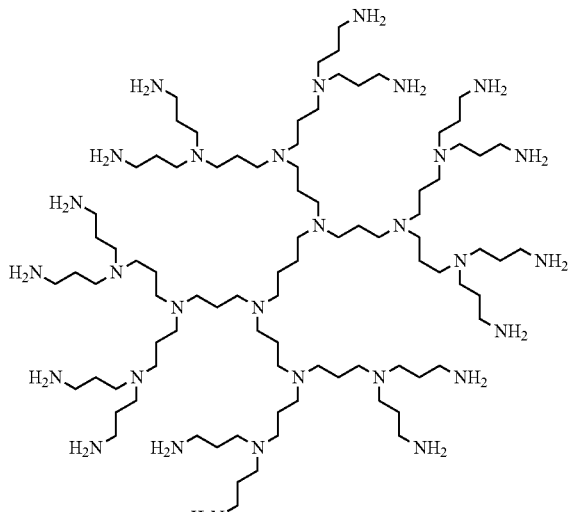
(XIII)

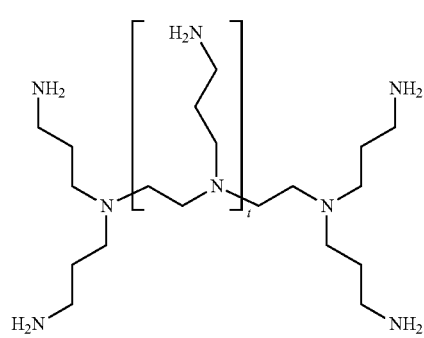
(XIV)

in which t is an integer such that the number-average molar mass ranges from 130 to 1800 g/mol, preferably ranges from 140 to 1700 g/mol;

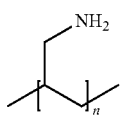
(XV)

in which n is an integer ranging from 3 to 20;

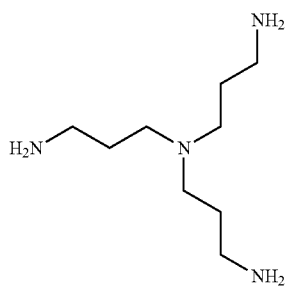
(XVI)

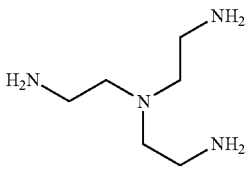
(XVII)

According to one embodiment, the polyamine or the mixture of polyamines B2 has a primary alkalinity ranging from 8.00 to 21.00 meq/g, preferably ranging from 9.00 to 18.00 meq/g.

According to one embodiment of the invention, the polyamine B2 has a number-average molar mass ranging from 130 to 1800 g/mol, preferably ranging from 140 to 1700 g/mol.

According to a preferred embodiment, composition B comprises a diamine B1 of formula (IV) or (V) as defined previously, and a polyamine B2 of formula (VI) as defined previously, in particular in a mass ratio B1/B2=50/50.

According to one embodiment, composition B has a primary alkalinity/total alkalinity ratio ranging from 0.25 to 0.70.

Preferably, the diamine B1/polyamine B2 mass ratio in composition B ranges from 30/70 to 70/30, preferentially from 40/60 to 60/40 and is in particular about 50/50.

Composition B may be prepared by simple mixing of the constituents, preferably at a temperature ranging from 10° C. to 50° C., preferably at room temperature, preferably using a mechanical mixer.

Composition

According to one embodiment of the invention, the mole ratio NH$_2$/T (r3) in the composition ranges from 0.8 to 1.2, preferably from 0.9 to 1.1, or even is about 1.0, with T being as defined previously:

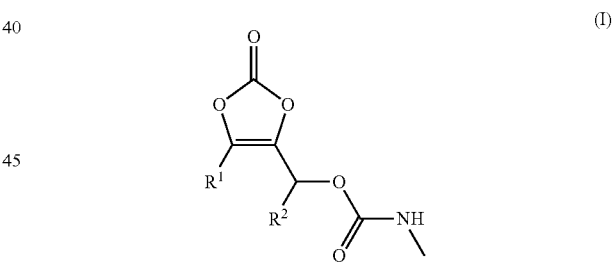
(I)

In the context of the invention, and unless otherwise mentioned, (r3) is the mole ratio NH$_2$/T corresponding to the mole ratio of the number of NH$_2$ amine groups to the number of groups T borne by all of the amine(s) and polyurethane(s) bearing end groups T present in the composition.

According to one embodiment of the invention, the mass ratio between composition A and composition B, in the composition, ranges from 100/3 to 100/50, preferably from 100/3 to 100/30.

The composition, preferably the adhesive composition, according to the invention may comprise at least one cross-linking catalyst. The crosslinking catalyst may be present in composition A and/or in composition B, preferably in composition A.

The crosslinking catalyst(s) may be any catalyst usually used to accelerate the ring-opening reaction of a compound including a function of formula (I) with a primary amine.

As examples of crosslinking catalysts that may be used according to the invention, mention may be made of:
- alkoxides, such as potassium tert-butoxide or sodium methoxide;
- strong bases chosen from:
  - phosphazenes, such as 2-(tert-butylimino)-2-diethylamino-1,3-dimethylperhydro-1,3,2-diazaphosphorine (BMEP),
  - guanidines, such as:
    - 1,5,7-triazabicyclo[4.4.0]dec-5-ene (TBD):

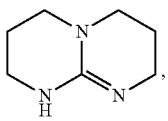

N-methyltriazabicyclodecene (Me-TBD):

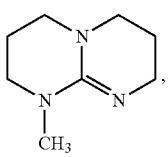

tertiary amines, such as:
1,8-diazabicyclo[5.4.0]undec-7-ene (DBU):

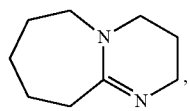 [SMILES: C1CCC2=NCCCN2CC1]

1,5-diazabicyclo[4.3.0]non-5-ene (DBN):

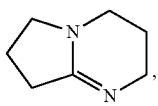

2,2'-dimorpholinodiethyl ether (DMDEE):

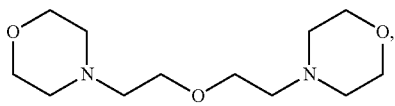 [SMILES: C1CN(CCOCCN2CCOCC2)CCO1]

1,4-diazabicyclo[2.2.2]octane (DABCO):

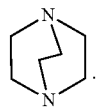

An amount ranging from 0.03 to 3% by weight or even from 0.05% to 1% by weight of crosslinking catalyst(s) relative to the total weight of the composition according to the invention may be used.

The crosslinking catalyst(s) may be distributed in one or more of the compositions (for example in composition A and/or in composition B defined above) forming the composition according to the invention.

The composition, preferably the adhesive composition, according to the invention may also comprise at least one mineral filler, preferably in an amount not exceeding 70% by weight relative to the weight of said composition. The filler(s) may be present in composition A and/or in composition B.

The mineral filler(s) that may be used are preferentially chosen so as to improve the mechanical performance of the composition according to the invention in the crosslinked state.

As examples of fillers that may be used, mention may be made, in a nonlimiting manner, of calcium carbonate, kaolin, silica, gypsum, microspheres and clays.

Preferably, the mineral filler(s) have a maximum particle size, notably an outside diameter, of less than 100 μm and preferably less than 10 μm. Such fillers may be selected, in a manner well known to a person skilled in the art, by using sieves having appropriate mesh sizes.

The composition, preferably the adhesive composition, according to the invention may also comprise at least one adhesion promoter preferably chosen from silanes, aminosilanes or acryloylsilanes. The adhesion promoter(s) may be present in composition A and/or in composition B, preferably in composition A.

The composition, preferably the adhesive composition, according to the invention may include up to 2% by weight of one or more other additives appropriately chosen so as not to deteriorate the properties of the adhesive composition according to the invention in the crosslinked state. Among the additives that may be used, examples that may be mentioned include antioxidants or UV (ultraviolet) stabilizers, pigments and dyes. These additives are preferably chosen from those usually used in adhesive compositions.

The other additive(s) may be distributed in one or more of the compositions forming the composition according to the invention.

Ready-to-Use Kit

The present invention also relates to a ready-to-use kit, comprising composition A as defined above, on the one hand, and composition B as defined above, on the other hand, packaged in two separate compartments.

Specifically, the composition, preferably the adhesive composition, according to the invention may be in a two-pack form, for example in a ready-to-use kit, comprising composition A, on the one hand, in a first compartment or drum and composition B, on the other hand, in a second compartment or drum, in proportions suitable for direct mixing of the two compositions, for example by means of a metering pump.

According to one embodiment of the invention, the kit also comprises one or more means for mixing the two compositions A and B. Preferably, the mixing means are chosen from metering pumps and static mixers of diameter suited to the amounts used.

Multilayer (Complex) Structure

A subject of the present invention is also a multilayer (complex) structure comprising at least two layers of material bonded together by an adhesive layer, characterized in that said adhesive layer consists of the adhesive composition, preferably the adhesive composition, according to the invention in the crosslinked state.

The adhesive layer preferably has a thickness ranging from 1.2 to 5 μm.

The adhesive layer is obtained by crosslinking the composition according to the invention in an amount preferably ranging from 1.2 to 5 g/m².

The materials of which the layers of material surrounding the adhesive layer are made are generally chosen from paper, metal, for instance aluminum, or thermoplastic polymers such as:
- polyethylene (PE),
- polypropylene (PP),
- a copolymer based on ethylene and propylene,
- polyamide (PA),
- polyethylene terephthalate (PET), or else
- a copolymer based on ethylene, for instance a maleic anhydride-grafted copolymer, a copolymer of ethylene and of vinyl acetate (EVA), a copolymer of ethylene and of vinyl alcohol (EVOH) or a copolymer of ethylene and of an alkyl acrylate, such as methyl acrylate (EMA) or butyl acrylate (EBA),
- polystyrene (PS),
- polyvinyl chloride (PVC),
- polyvinylidene fluoride (PVDF),
- a polymer or copolymer of lactic acid (PLA), or
- a polyhydroxyalkanoate (PHA).

An individual layer of material may itself consist of several materials. It may be, for example, a layer of thermoplastic polymers obtained by coextrusion of two polymers (there is then no adhesive between the coextruded layers), the individual layers of thermoplastic polymer may also be coated with a substance (for example based on aluminum oxide or silicon oxide) or metallized (in the case of PET metallized with aluminum particles) to add an additional barrier effect.

The thickness of the two layers of material adjacent to the adhesive layer and of the other layers of material used in the multilayer structure according to the invention is liable to vary within a wide range extending, for example, from 5 to 150 μm. The total thickness of said structure is also liable to vary within a wide range extending, for example, from 20 to 400 μm.

Preferably, the multilayer structure is provided in the form of a multilayer film.

Complexing Process

A subject of the invention is also a process for manufacturing the multilayer (complex) structure according to the invention, comprising the following steps:
- mixing composition A and composition B, then
- coating said mixture over the surface of a first layer, then
- laminating the surface of a second layer over said coated surface, then
- crosslinking said mixture.

The step of mixing composition A and composition B may be performed at room temperature or with heating, before coating.

Preferably, the mixing is performed at a temperature below the decomposition temperature of the ingredients included in one or other of compositions (A) and (B). In particular, the mixing is performed at a temperature below 95° C., preferably ranging from 15 to 80° C., more preferably ranging from 25° C. to 50° C., in order to avoid any thermal decomposition.

Preferably, composition A and composition B are mixed in amounts such that the mole ratio of the number of primary amine groups to the number of functions T present in the mixture, denoted as (r3), ranges from 0.8 to 1.2, preferably from 0.9 to 1.1.

According to one embodiment, when a solvent is present in compositions A and/or B and/or when a solvent is added during the mixing of composition A and of composition B, then the complexing process comprises a step of evaporating the solvent(s); said solvent evaporation step is then performed before crosslinking the mixture, preferably before the laminating step.

Said mixture may be coated onto all or part of the surface of a material. In particular, said mixture may be coated in the form of a layer with a thickness ranging from 1.2 to 5 μm. The coating is preferably performed continuously or substantially continuously.

Optionally, the crosslinking of said mixture on the surface of the material can be accelerated by heating the coated material(s) to a temperature of less than or equal to 70° C. The time required to complete this crosslinking reaction and to thus ensure the required level of cohesion is generally of the order of 0.5 to 24 hours.

The coating and laminating of the second material are generally performed within a time interval that is compatible with the coating process, as is well known to a person skilled in the art, that is to say before the adhesive layer loses its ability to attach the two materials by adhesive bonding.

Use of the Multilayer Structure

Finally, the invention relates to the use of the multilayer (complex) structure according to the invention for the manufacture of flexible packagings. Specifically, the complexes according to the invention may be used for the manufacture of very varied flexible packagings, which are formed and then closed (after the step of packaging the product intended for the consumer) via heat-sealing (or heat-welding) techniques.

In particular, the complex according to the invention may be used in food packaging, without any risk of toxicity. The packagings intended for foodstuffs are generally heat-treated at temperatures ranging from 60° C. to 135° C. before use. In particular, they may be pasteurized (at temperatures ranging from 90° C. to 95° C.) or sterilized (at temperatures ranging from 128° C. to 135° C.).

The multilayer structure according to the invention has the advantage of being able to be pasteurized or sterilized.

All the embodiments described above may be combined with each other. In particular, the various abovementioned constituents of the composition, and notably the preferred embodiments, of the composition may be combined with each other.

In the context of the invention, the term "between x and y" or "ranging from x to y" means a range in which the limits x and y are included. For example, the range "between 0% and 25%" includes in particular the values 0% and 25%.

The invention is now described in the following implementation examples which are given purely by way of illustration and should not be interpreted in order to limit the scope thereof.

EXAMPLES

The following ingredients were used:

Composition A

Voranol® P 400: difunctional polypropylene glycol with a hydroxyl number OHN ranging from 250 to 270 mg KOH/g (available from the company Dow);

Voranol® C P 450: trifunctional polypropylene glycol with a hydroxyl number OHN ranging from 370 to 396 mg KOH/g (available from the company Dow);

Realkyd® XTR 10410: difunctional polyester polyol with a hydroxyl number OHN ranging from 108 to 116 mg KOH/g (available from the company Cray Valley);

Scuranate® TX: toluene diisocyanate (TDI) containing 48.1% by weight of NCO functions and comprising 95% by weight of 2,4-TDI isomer (available from the company Vencorex);

Desmodur® N3300: hexamethylene diisocyanate isocyanurate (HDI) (available from the company Covestro);

4-hydroxymethyl-5-methyl-1,3-dioxolen-2-one synthesized according to patent application WO 9 602 253 from Merck (purity of 99% by weight) and having a hydroxyl number OHN of 431 mg KOH/g;

ethyl acetate: solvent;

Borch KAT® 315: catalyst based on bismuth neodecanoate (available from the company Borchers);

Tyzor Pita®: catalyst based on titanium ethylacetoacetate (available from the company Dorf Ketal);

Silquest® A1110: adhesion promoter of (3-aminopropyl)trimethoxysilane type (available from the company Momentive).

The polyol(s) were dried before being reacted with the polyisocyanate(s) used for the synthesis of the polyurethane prepolymer.

Composition B

Jeffamine® ED 148 (available from the company Huntsman): diamine (of B1 type) with a molar mass of 148.20 g/mol and a primary alkalinity of 13.49 meq/g and corresponding to the formula $H_2N-CH_2-CH_2-O-CH_2-CH_2-O-CH_2-CH_2-NH_2$. Jeffamine® ED 148 has a primary alkalinity/total alkalinity ratio of 1.00 determined by potentiometry;

Lupasol® FG (available from the company BASF): polyamine (of B2 type) with a molar mass of 800 g/mol and a primary alkalinity of 9.75 meq/g and corresponding to the general formula (VI):

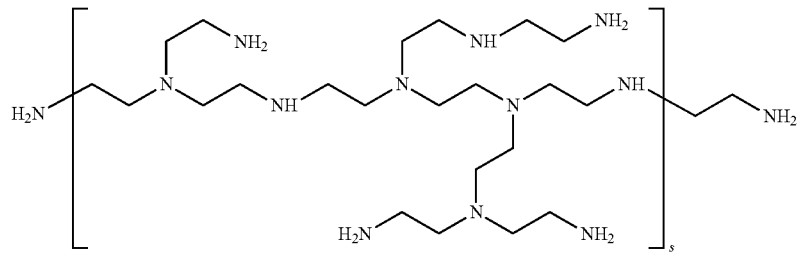

s being as defined previously;

Lupasol® FG has a primary alkalinity/total alkalinity ratio of 0.42 determined by $^{13}C$ NMR.

$H_2N-(CH_2)_{10}-NH_2$: diamine (of B1 type) with a molar mass of 172 g/mol and a primary alkalinity of 11.61 meq/g. $H_2N-(CH_2)_{10}-NH_2$ has a primary alkalinity/total alkalinity ratio of 1.00, determined by potentiometry.

Example 1: Preparation of a Composition A-1 Based on a Polyurethane Bearing T End Groups Based on Polyether Polyols and Polyester Polyols 190.7 g of Scuranate® TX and 100 g of ethyl acetate are placed in a reactor and heated to 40° C. 22.7 g of Voranol® CP 450 and then 103.3 g of Voranol® P 400 are then introduced in turn, taking care to ensure that the temperature of the mixture does not exceed 80° C. When the temperature of the mixture has stabilized, the mixture is heated for about 1 hour at 80-85° C. and is then cooled to 70° C. 321.6 g of Realkyd® XTR 10410 are then introduced, taking care to ensure that the temperature of the mixture does not exceed 90° C.

The mixture is maintained at 90° C. for about 3 hours. The end of the reaction is monitored by controlling the mass percentage of NCO functions in the medium, this percentage needing to be in theory about 5.7%. When the reaction is complete, the mixture is cooled to 70° C. and 113.9 g of 4-hydromethyl-5-methyl-1,3-dioxolen-2-one and 0.5 g of Tyzor Pita® are introduced. 7.5 g of Silquest® A1110 are added and the mixture is then maintained at 70° C. for 6 to 8 hours until no more NCO functions are visible in infrared (IR) (disappearance of the characteristic band of the NCO function at about 2250 $cm^{-1}$).

When the mass percentage of NCO functions is less than 0.1% (no more NCO band visible), 150 g of ethyl acetate are added. The content of T functions of the polyurethane bearing T end groups is about 0.96 meq/g.

Example 2: Preparation of a Composition A-2 Based on a Polyurethane Bearing T End Groups Based on Polyether Polyols and Polyester Polyols 143.2 g of Scuranate® TX and 100 g of ethyl acetate are placed in a reactor and heated to 40° C. 22.6 g of Voranol® CP 450 are added slowly and the mixture is heated to 50° C. 101.6 g of Voranol® P 400 are then added. The reaction mass rises exothermically to about 70° C. Once the exotherm is controlled, the mixture is maintained at 70° C. After 1 hour of reaction, 241.4 g of Realkyd® XTR 10410 are added. The reaction mass rises exothermically to about 85° C. The mixture is maintained at 85° C. for about 2-3 hours. The end of the reaction is monitored by controlling the mass percentage of NCO functions in the medium, this percentage needing to be in theory about 4.4% by weight. When the reaction is complete, the mixture is cooled to 70° C. and 76.6 g of Desmodur® N3300 are introduced. The mixture is homogenized for 20 minutes and 125.6 g of 4-hydroxymethyl-5-methyl-1,3-dioxolen-2-one are then added. 0.45 g of Tyzor Pita® is added and the mixture is then maintained at 80-85° C. for 3 hours until no more NCO functions are visible in IR (disappearance of the characteristic band of the NCO function at about 2250 $cm^{-1}$).

When the mass percentage of NCO functions is less than 0.1% (no more NCO band visible), 200 g of ethyl acetate are added. The content of T functions of the polyurethane bearing T end groups is about 0.95 meq/g.

Example 3: Preparation of the Compositions B

The compositions B that were tested were prepared by simple mixing of the diamine B1 (Jeffamine® ED 148 or $H_2N-(CH_2)_{10}-NH_2$) and/or of the polyamine B2 (Lupasol® FG) at room temperature (about 23° C.) in a B1/B2 weight ratio indicated below in table 1.

Example 4: Preparation of the Adhesive Compositions

The mixture of compositions A and B detailed in examples 1 to 3 was prepared in an A/B mass ratio indicated below in table 1.

TABLE 1 characteristics of the adhesive compositions tested

| | Nature of A | Nature of B | B1/B2 mass ratio | A/B mass ratio | $NH_2/T$ mole ratio |
|---|---|---|---|---|---|
| Composition 1 | A-1 | Jeffamine ® ED148 + B2 | 1/1 | 100/7.2 | 0.96 |
| Composition 2 | A-1 | $H_2N-(CH_2)_{10}-NH_2$ + B2 [1] | 1/1 | 100/26.5 | 0.94 |
| Composition 3 | A-2 | Jeffamine ® ED148 + B2 | 1/1 | 100/8.8 | 0.93 |

[1] composition B comprising the mixture of B1 and B2 was diluted to 29% by weight in an ethanol solvent.

Compositions 1 to 3 were prepared either from composition A of example 1 (A-1) or from composition A of example 2 (A-2).

The $NH_2/T$ ratio represents the mole ratio of the number of primary amine functions to the number of functions (T present in the adhesive composition (A+B)).

Example 5: Preparation of the Complexes

Preparation of the supports: the layers of material are cut into the desired format and stapled to a Bristol board.

Preparation of the adhesive composition: composition A and composition B are mixed in a glass bottle, with optional addition of ethyl acetate. In the latter case, the solids content of the adhesive composition is about 30% by weight to have a basis weight of the order of 1.2 to 5 g/m² for each of the interfaces between two substrates.

Production of the multilayer (complex) structure:

The adhesive is applied to an aluminum layer reinforced with polyethylene terephthalate (PET) using an applicator with a Mayer bar, Clips are attached to hold the support to the Bristol board on the non-stapled side and the support is placed in a ventilated oven for 2 minutes at 105° C. to evaporate the solvent, The glued support and the support to be laminated are stapled together on one edge. The clips are removed and the assembly is laminated using a pressure roller, The complex is placed under a press and left to crosslink either at room temperature or in a ventilated oven at 40° C. under a press (metal plates).

Various complexes were prepared using a PET12/ALU9/CPP70 three-layer system defined below, each layer being separated by an adhesive layer as detailed in table 2 below:

TABLE 2 characteristics of the complexes

| | Adhesive composition | Basis weight (g/m²) |
|---|---|---|
| Film 1 | Composition 1 | 4.5 |
| Film 2 | Composition 2 | 3.9 |
| Film 3 | Composition 3 | 4.4 |

PET12/ALU9/CPP70: system consisting of a layer of polyethylene terephthalate 12 μm thick (PET12), a layer of cast polypropylene 70 μm thick (CPP70) and a thin layer of aluminum 9 μm thick (ALU9) positioned between the two layers PET12 and CPP70.

Example 6: Measurement of the Cohesion of the Complexes of Example 5 Before and after Sterilization Test and Qualitative Assessment of the Resistance of Said Complexes to Sterilization 180° Peel (Measurement of the Cohesion):

The cohesion of the complex is evaluated by the 180° peel test as described in the French standard NF T 54-122 (October 1976). The principle of this test consists in determining the force necessary to separate (or peel) two individual layers of the complex bonded by the adhesive.

A test specimen of rectangular shape 15 mm wide and about 15 cm long is cut out from the two-layer complex. The test specimens are cut out in the machine direction of the coating. The two individual layers of the complex included in this strip are manually detached from the end of this test specimen, and over approximately 2 cm, and the two free ends thus obtained are attached to two holding devices respectively connected to a stationary part and a movable part of a tensile testing device which are located on a vertical axis.

While a drive mechanism imparts a uniform speed of 100 mm/minute to the movable part, resulting in the detachment of the two layers, the detached ends of which gradually move along a vertical axis with the formation of an angle of 180°, the stationary part-connected to a DY30 dynamometer-measures the force withstood by the test specimen thus held, which force is measured in newtons (N).

Each test is repeated three times and the mean value of the three measurements is indicated in table 3 below.

The measurement of the cohesion before sterilization was performed 7 days after manufacturing the multilayer film (D+7).

As illustrated in table 3 below, the cohesion was also measured 24 hours after sterilization.

Qualitative Assessment of the Resistance to Sterilization:

The quality of the adhesion between the layers of material of the multilayer structures tested, after sterilization, was also evaluated.

In particular, the presence or absence of unevennesses, which may be of various forms (for example channels or blisters) or bubbles was noted. The presence of these deformations of the multilayer structure reflects the infiltration of water between the layers of the multilayer structure resulting from degradation of the adhesive during the sterilization.

In addition, the adhesive was checked to see if it had un-crosslinked during the sterilization. To do this, after having performed the peel test described above on each of the films tested, the presence or absence of tack (bonding power) was evaluated by exerting a gentle pressure of the index finger on the surface of the layer of adhesive left visible after separation of the layers of material.

The observations are collated in table 3 below.

Sterilization Test

In the present example, the sterilization test was performed once the adhesive had crosslinked in the complex (about 7 days after preparation of the complex in accordance with example 5). Sachets were prepared using a complex prepared in example 5, without sealing the fourth edge. The sachets are placed on an autoclave grate (vapor phase) and left for 1 hour at 130° C. in the autoclave under 3 bar.

TABLE 3

| | Measurement of the cohesion | | | |
|---|---|---|---|---|
| | | Film 1 | Film 2 | Film 3 |
| Before sterilization | Time t | (D + 7) | (D + 7) | (D + 7) |
| | Cohesion at time t (N/15 mm) | 4.9 | 6.2 | 4.8 |
| | Observations at time t | No tack | No tack | No tack |
| | | — | — | — |
| | | Alu torn | Alu torn | Alu torn |
| 24 hours after sterilization | Cohesion (N/15 mm) | 4.0 | 3.1 | 4.4 |
| | Observations | No tack | No tack | No tack |
| | | No channels | No channels | No channels |

In table 3 above:
when "no tack" is observed, then the film passes the sterilization test,
when "tack" is observed, then the film does not pass the sterilization test,
when channels are observed, then the film does not pass the sterilization test,
when a tear is observed, then the film passes the sterilization test.

The invention claimed is:

1. A composition comprising:
a composition A comprising at least one polyurethane comprising at least two end functions T of formula (I) below:

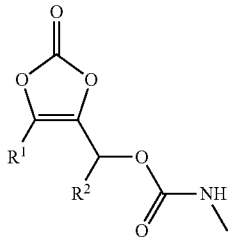

wherein $R^1$ and $R^2$, which may be identical or different, each represent a hydrogen atom, a linear or branched alkyl group, a cycloalkyl group, a phenyl group, or an alkylphenyl group with a linear or branched alkyl chain; or $R^1$ and $R^2$ may be bonded together to form a group —$(CH_2)_n$— with n=3, 4 or 5, and
a composition B comprising at least one amine.

2. The composition as claimed in claim 1, wherein the polyurethane comprising at least two end functions T of formula (I) is obtained by reaction of a polyurethane bearing NCO end groups and of at least one compound of formula (II) below:

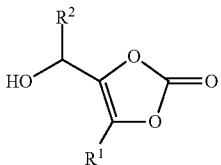

wherein $R^1$ and $R^2$ are as defined in claim 1.

3. The composition as claimed in claim 1, wherein $R^1$ is a methyl and $R^2$ is a hydrogen.

4. The composition as claimed in claim 1, wherein the polyurethane comprising at least two end functions T is prepared via a process comprising the following steps:
E1) the preparation of a polyurethane bearing NCO end groups via a polyaddition reaction:
i) of at least one polyisocyanate;
ii) with at least one polyol; in amounts such that the NCO/OH mole ratio (r1) is strictly greater than 1; and
E2) the reaction of the product formed on conclusion of step E1) with at least one compound of formula (II)

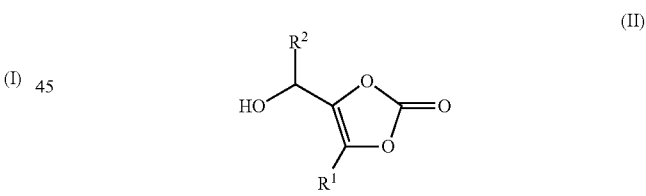

wherein $R^1$ and $R^2$ are as defined in claim 1,
in amounts such that the NCO/OH mole ratio (r2) is less than or equal to 1.

5. The composition as claimed in claim 4, wherein at least one polyol is chosen from polyester polyols.

6. The composition as claimed in claim 1, wherein composition B comprises:
at least one diamine B1, and
at least one polyamine B2,
wherein the diamine B1/polyamine B2 mass ratio ranges from 30/70 to 70/30.

7. The composition as claimed in claim 6, wherein the diamine or the mixture of diamines B1 has a primary alkalinity ranging from 3.00 to 20.00 meq/g.

8. The composition as claimed in claim 6, wherein the polyamine or the mixture of polyamines B2 has a primary alkalinity 8.00 to 21.00 meq/g.

9. The composition as claimed in claim 6, wherein the composition B has a ratio of primary alkalinity to total alkalinity ranging from 0.25 to 0.70.

10. The composition as claimed in claim 1, wherein the mole ratio of the number of primary amine functions to the number of T functions ranges from 0.8 to 1.2.

11. The composition as claimed in claim 1, wherein it is an adhesive composition.

12. A ready-to-use kit comprising the composition as claimed in claim 1, wherein compositions A and B are packaged in two separate compartments.

13. A multilayer structure comprising at least two layers of material bonded together by an adhesive layer, wherein said adhesive layer comprises the composition as claimed in claim 1, in the crosslinked state.

14. The multilayer structure as claimed in claim 13, wherein the adhesive layer has a thickness ranging from 1.2 to 5 μm.

15. The multilayer structure as claimed in claim 13, further comprising at least one layer of aluminum-based material.

16. A process for manufacturing a multilayer structure as claimed in claim 13, comprising the following steps:
   mixing composition A and composition B to form a mixture, then
   coating said mixture over a surface of a first layer of material to form a coated surface, then
   laminating a surface of a second layer of material over said coated surface, then
   crosslinking said mixture.

17. The manufacturing process as claimed in claim 16, wherein the mixture of composition A and of composition B comprises at least one solvent and wherein the process also comprises a step of evaporating the solvent(s).

* * * * *